(12) United States Patent
Slesinski et al.

(10) Patent No.: US 12,351,009 B2
(45) Date of Patent: Jul. 8, 2025

(54) SYSTEMS AND METHODS FOR AN ELECTRIC AXLE

(71) Applicant: Dana Heavy Vehicle Systems Group, LLC, Maumee, OH (US)

(72) Inventors: Steven G. Slesinski, Ann Arbor, MI (US); Jeffrey M. David, Cedar Park, TX (US); Jeremy M. Frenznick, Brighton, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 295 days.

(21) Appl. No.: 18/051,436

(22) Filed: Oct. 31, 2022

(65) Prior Publication Data

US 2024/0140184 A1    May 2, 2024

(51) Int. Cl.
  *B60K 1/00* (2006.01)
  *B60K 17/35* (2006.01)
  *B60K 17/356* (2006.01)

(52) U.S. Cl.
  CPC ............... *B60K 1/00* (2013.01); *B60K 17/35* (2013.01); *B60K 17/356* (2013.01); *B60K 2001/001* (2013.01)

(58) Field of Classification Search
  CPC .................. B60K 17/35; B60K 17/356; B60K 2001/001; B60K 17/36; B60K 1/00; B60K 2006/4841; B60Y 2200/91; F16H 3/091; F16H 2200/0021; F16H 2200/0039; F16H 2200/2038; F16H 2003/007
  See application file for complete search history.

(56) References Cited

U.S. PATENT DOCUMENTS

| | | | |
|---|---|---|---|
| 9,656,541 B2 | 5/2017 | True et al. | |
| 11,001,134 B2 | 5/2021 | Haka et al. | |
| 2003/0226416 A1* | 12/2003 | Umemoto | B60W 30/1819 74/335 |
| 2016/0068053 A1 | 3/2016 | True et al. | |
| 2020/0269675 A1 | 8/2020 | Haka et al. | |
| 2021/0086611 A1* | 3/2021 | Inoh | B60K 1/02 |
| 2021/0252987 A1* | 8/2021 | Brenninger | F15B 15/18 |
| 2022/0032755 A1* | 2/2022 | Seemann | B60K 17/16 |
| 2022/0134856 A1 | 5/2022 | Andringa et al. | |
| 2023/0103790 A1* | 4/2023 | Lgl | B60K 17/08 180/242 |
| 2023/0278457 A1* | 9/2023 | Li | B60K 1/02 180/65.1 |
| 2024/0218919 A1* | 7/2024 | Li | B60K 17/08 |

FOREIGN PATENT DOCUMENTS

| | | |
|---|---|---|
| CA | 3137197 A1 | 4/2022 |
| CN | 205997696 U | 3/2017 |
| CN | 207257337 U | 4/2018 |

(Continued)

*Primary Examiner* — Farhana Pervin
(74) *Attorney, Agent, or Firm* — McCoy Russell LLP

(57) ABSTRACT

Systems and methods are provided for an electric axle assembly. In one example an assembly is provided comprising, a first axle, an electric motor directly mounted to the first axle, a transmission gear train coupling the electric motor to an interaxle output shaft, and a plurality of clutches for selectively coupling the electric motor and the interaxle output shaft, the interaxle output shaft selectively driving one of a second axle and an auxiliary device.

20 Claims, 4 Drawing Sheets

(56) References Cited

FOREIGN PATENT DOCUMENTS

| | | |
|---|---|---|
| CN | 207257341 U | 4/2018 |
| CN | 207257371 U | 4/2018 |
| CN | 207809023 U | 9/2018 |
| CN | 207825906 U | 9/2018 |
| CN | 108638839 A | 10/2018 |
| CN | 208133969 U | 11/2018 |
| CN | 109094298 A | 12/2018 |
| CN | 113614417 A | 11/2021 |
| WO | 2018156676 A2 | 8/2018 |
| WO | 2020192829 A1 | 10/2020 |
| WO | 2021072121 A1 | 4/2021 |
| WO | 2021072123 A1 | 4/2021 |
| WO | 2021072124 A1 | 4/2021 |

\* cited by examiner

*300*

| Clutch Apply Chart | | |
|---|---|---|
| Mode | Clutch 1 | Clutch 2 |
| Gear 1 | - | + |
| Gear 2 | - | - |
| Gear 2a | + | + |
| Gear 3 | + | - |
| Neutral | 0 | 0 |

| Clutch Apply Chart | | | |
|---|---|---|---|
| Mode | Clutch 1 | Clutch 2 | Clutch 3 |
| Gear 1 | - | + | Open |
| Gear 2 | - | - | Open |
| Gear 2a | + | + | Open |
| Gear 3 | + | - | Open |
| Neutral | 0 | 0 | Open |
| Any gear with supplemental output on (excluding Neutral) | | | Closed |

FIG. 3B

SYSTEMS AND METHODS FOR AN ELECTRIC AXLE

TECHNICAL FIELD

The present description relates generally to methods and systems for an electric axle having an output capability to drive a traditional axle for tandem or tridem applications or to provide power to an auxiliary device.

BACKGROUND AND SUMMARY

Tandem or tridem drive assemblies may be included on vehicles having high weight or high load carrying capacity such as heavy duty trucks and other commercial vehicles. For vehicles having an internal combustion engine, an interaxle differential may be used to split an input shaft torque between a front axle and rear axle of the tandem. For an electric or hybrid electric commercial vehicle, adding a drive axle or auxiliary device may include adding an electric drive axle having a motor and an inverter. For example, a tandem or tridem electric vehicle may include two or more independently controlled electric axles. However, adding additional motors and inverters to achieve alternate drive and auxiliary device capability is costly, heavy, difficult to package in a chassis, and complex.

In one example, the issues described above may be addressed by an assembly comprising: a first axle, an electric motor directly mounted to the first axle, a transmission gear train coupling the electric motor to an interaxle output shaft, and a plurality of clutches for selectively coupling the electric motor and the interaxle output shaft, wherein the interaxle output shaft selectively drives one of a second axle and an auxiliary device. In this way, the assembly drives a tandem axle or an auxiliary device without additional traction motors and inverters.

In some examples, the assembly may include an interaxle differential and a supplemental output, wherein the interaxle differential is interposed between the interaxle output shaft and the supplemental output. As one example, an auxiliary component coupled to the supplemental output may be driven via the transmission gear train. The transmission gear train may include an input shaft with a first pair of gears that reside thereon and a first clutch positioned between the first pair of gears and designed to selectively rotationally couple a selected gear in the first pair of gears to the input shaft. The transmission gear train may further include an idler shaft with a second pair of gears fixedly coupled thereto. A second clutch may be included that is positioned between a third pair of gears residing on an output shaft. The second clutch may be designed to selectively rotationally couple a selected gear in the third pair of gears to the output shaft. In some examples, a third clutch may be positioned between the supplemental output and the transmission gear train and designed to selectively rotationally couple the interaxle output shaft and the transmission gear train. In this way, the electric axle and auxiliary component may achieve variable operating gears when desired and increased efficiency when power to the auxiliary component is not desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A is a first table of clutch configurations in different operating gears of the electric axle assembly.

FIG. 3B is a second table of clutch configurations in different operating gears of the electric axle assembly.

DETAILED DESCRIPTION

Figure 1:
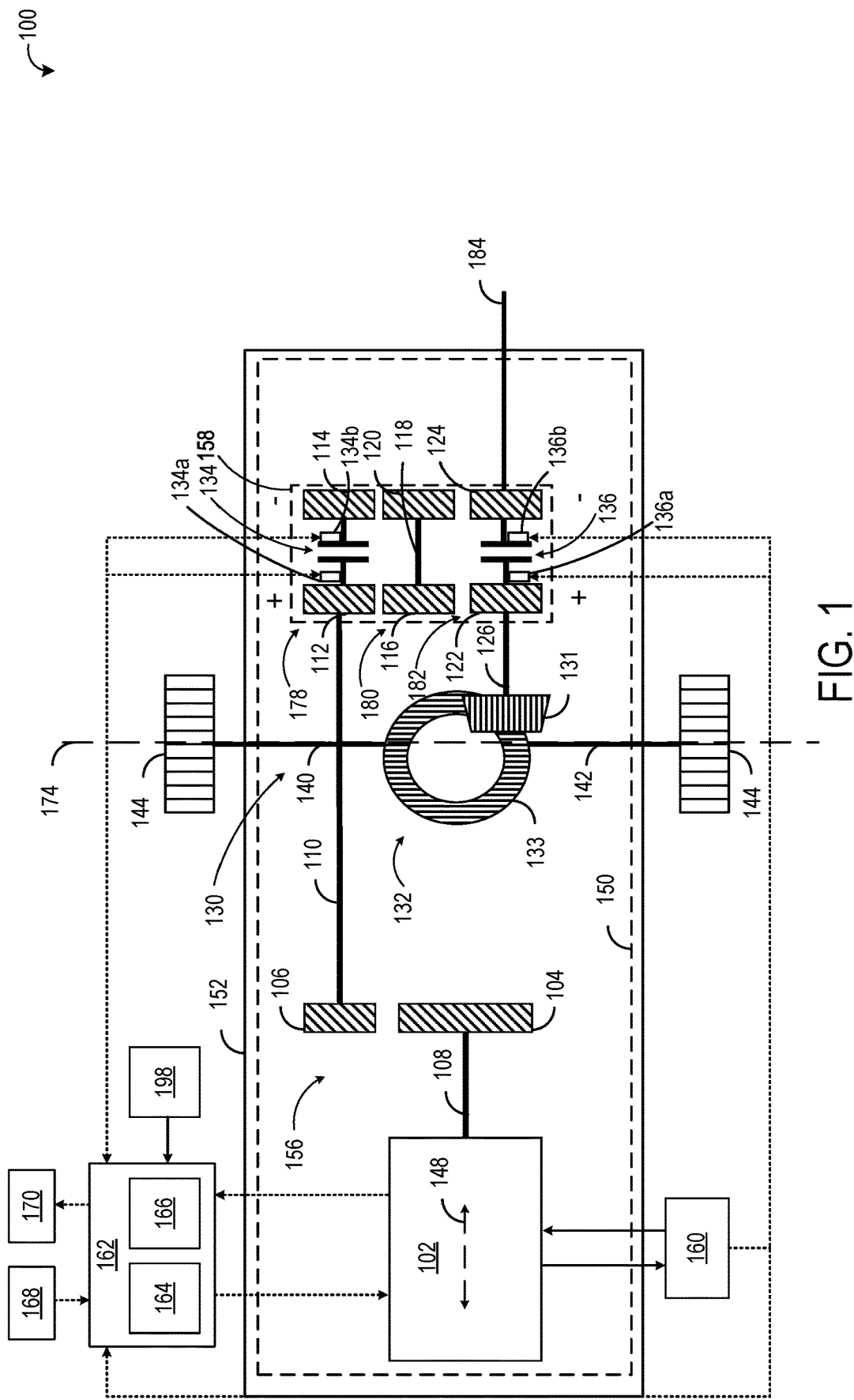
FIG. 1 is a schematic diagram of a first example for an electric axle assembly
Figure 2:
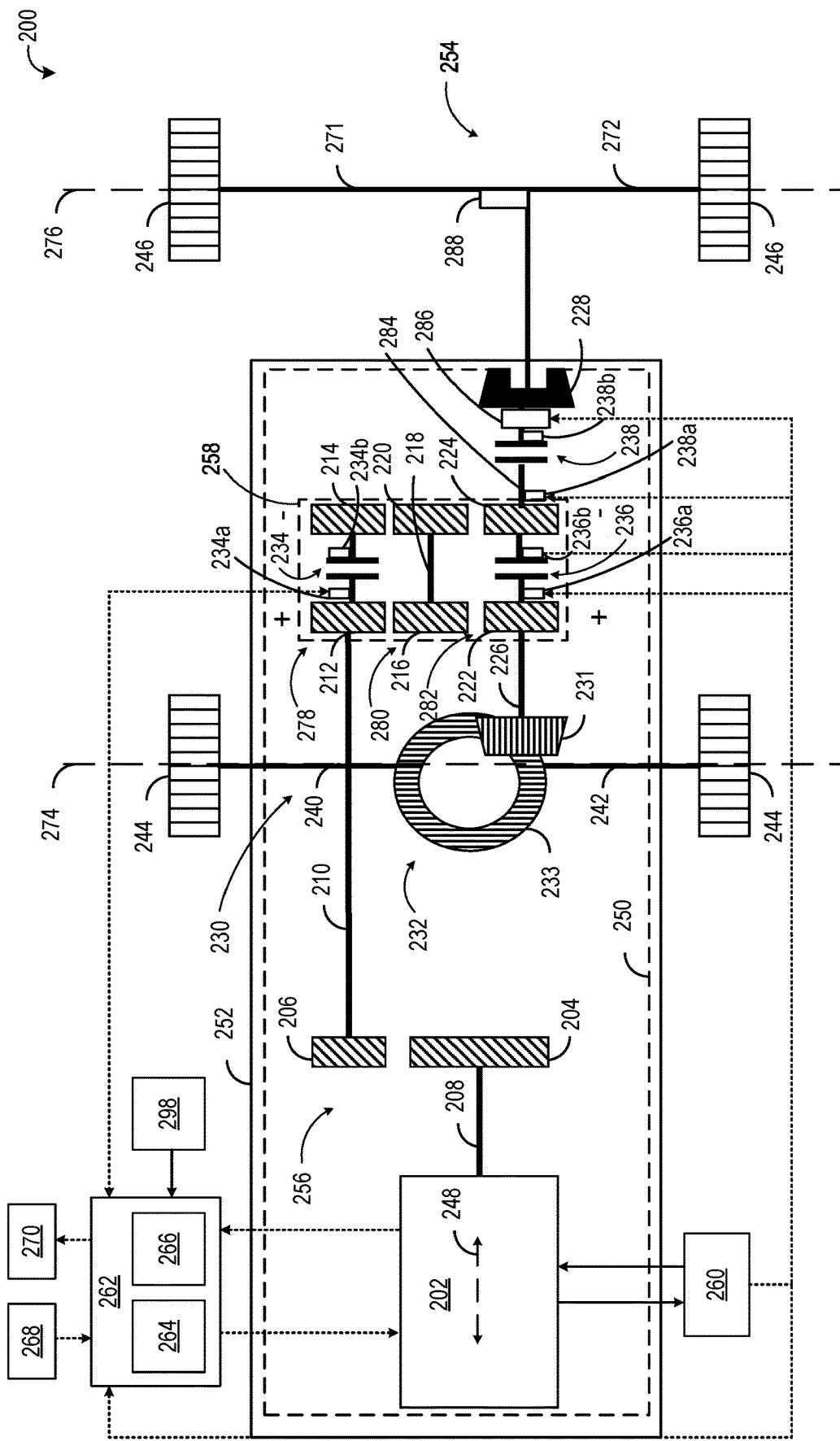
FIG. 2 is a schematic diagram of a second example for an electric axle assembly.
Figure 4:
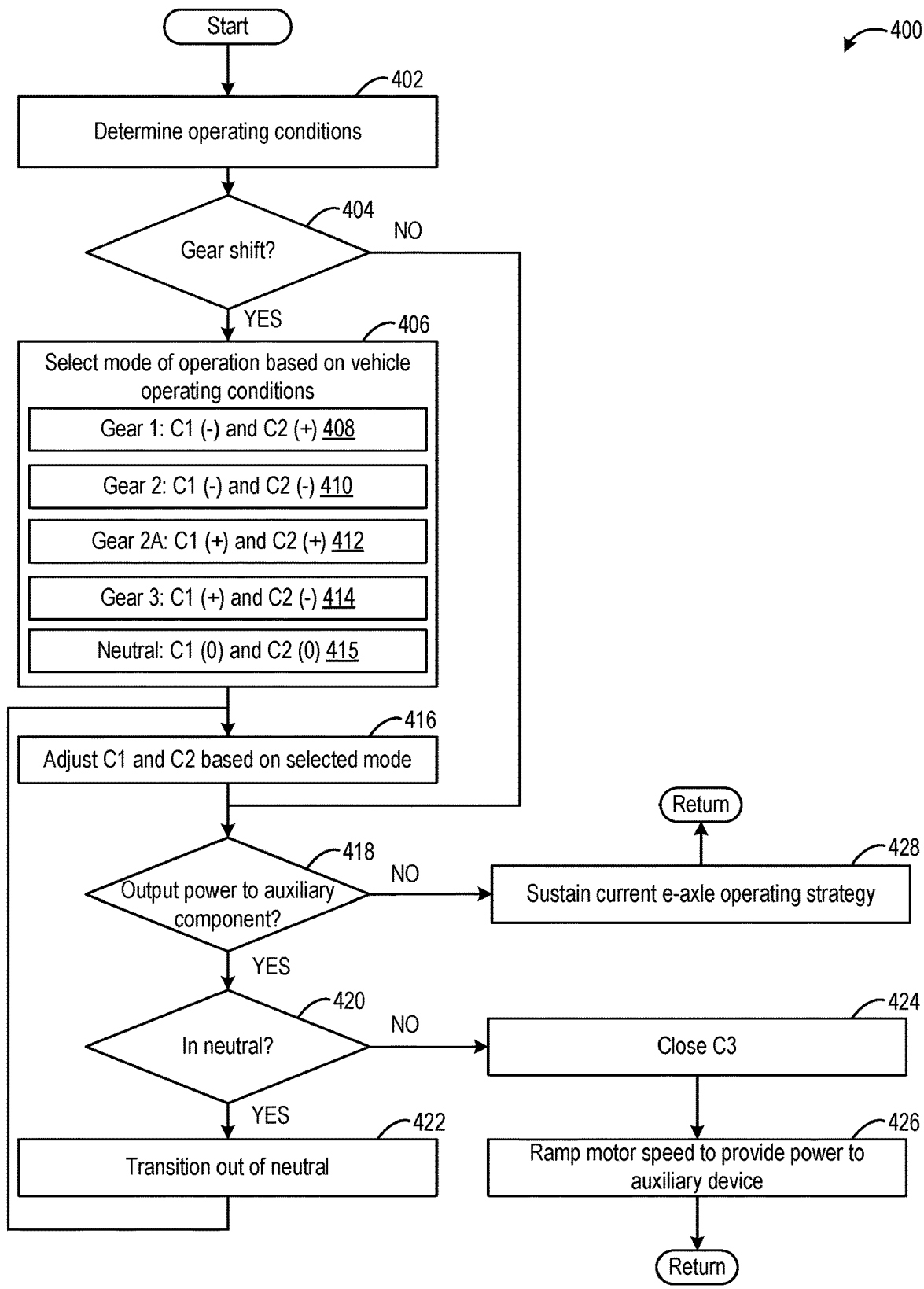
FIG. 4 is a flow chart for a method for operating an electric axle assembly.

The following description relates to systems and methods for an electric axle that enables an output capability to drive an auxiliary component such as additional axle or PTO device. By utilizing the electric axle electric motor and gearing, alternative shaft and geared drives may be realized, and without costly additional motors and inverters. In some examples, a single electric axle may sufficiently propel a vehicle. In other examples, vehicle operation may benefit from the addition of a second (e.g., tandem) axle for load carrying or traction purposes. The disclosed electric axle includes an interaxle output shaft for selectively coupling to a power take-off (PTO) device or an additional axle that may be driven off internal gears and shafts of the electric axle. The interaxle output shaft may be selectively driven through various geared features to allow for alternative speed of operation. Further, the interaxle output shaft may be combined with an interaxle differential to allow for tire speed variation during operation and, additionally or alternatively, the differential may be a locking differential. The disclosed electric axle, when coupled to an additional traditional axle, may facilitate brake regeneration for energy recovery using input from a plurality of wheel ends connected to the electric axle system. An example system for an electric axle having the disclosed output capability is illustrated in FIG. 1. An example system for an electric axle having the disclosed output capability including a third clutch for selectively coupling an auxiliary component is illustrated in FIG. 2. FIG. 3A and FIG. 3B illustrate clutch configurations in different operating gears for the disclosed electric axle. A flow chart for selecting gears of the axle and selectively operating a coupled auxiliary device or tandem axle is illustrated in FIG. 4.

FIG. 1 shows an example configuration for an electric axle 100. In one example, the electric axle 100 includes an electric motor 102 directly mounted to a first axle 130. The electric motor may include conventional components such as a stator, rotor, rotor shaft, and the like to enable the electric motor to generate mechanical power and electrical energy, when the motor is designed for regeneration. The rotational axis 148 of the electric motor 102 is provided. Electric motor 102 may receive electrical power from a battery 160 to provide torque to the first axle 130. In some examples, electric motor 102 may provide electrical power to battery 160. The dashed outline indicates a power path 150 of the electric axle 100 comprising a plurality of internal gears and shafts for transmitting power from the electric motor 102 to the first axle 130. The first axle 130 may be rotatably coupled with a pair of wheels 144 via axle half shafts 140, 142. The electric motor 102 generates mechanical energy that may be transferred through the first axle 130 to drive the wheels 144 about an axis 174. In some examples, the electric axle 100 may selectively provide rotational mechanical energy to power an auxiliary axle, e.g., a traditional axle, or auxiliary device e.g., a PTO device. Example coupling mechanisms are described in more detail with respect to FIG. 2.

In one example, the power path 150 of electric axle 100 may include a first shaft 108, a motor input gear train 156, a transmission input shaft 110 (also herein referred to as an input shaft or input shaft 110), a power transmission gear train 158 (also herein referred to as a transmission gear train or transmission gear train 158), an idler shaft 118, an output shaft 126, a hypoid gear set 132, an interaxle output shaft 184, a first clutch 134 and a second clutch 136. The first shaft 108 may couple the electric motor 102 to the motor input gear train 156. The transmission input shaft 110 may couple the motor input gear train 156 to the transmission gear train 158. The output shaft 126 may couple the transmission gear train 158 to the first axle 130. In particular, the axle half shafts 140, 142 may be coupled to the hypoid gear set 132 and the hypoid gear set 132 to the output shaft 126. The interaxle output shaft 184 may be coaxial with the output shaft 126 and driven via the transmission gear train 158 coupled thereto.

In one example, the motor input gear train 156 may comprise a first input gear 104 in mesh with a second input gear 106. In one example, the first input gear 104 and second input gear 106 may form an initial gear reduction. Numerous suitable gear ratios have been contemplated. The gear ratio selected for the initial gear reduction, and the other gear passes described herein may be selected based on a variety of factors such as the expected operating speed of the motor, the expected transmission load, a desired vehicle speed range, and the like.

In one example, the transmission gear train for the electric axle may comprise a plurality of parallel shafts having a plurality of helical gears in constant mesh. Transmission gear train 158 is shown having three parallel shafts and six helical gears. Clutches of the transmission gear train 158 may be operated in various combinations (e.g., electrically, pneumatically, hydraulically, etc.) to realize a multiple speed gear capability. The transmission gear train 158 may be arranged in a head pass (+) and a tail pass (−). The gears arranged in the head pass (+) are in mesh and the gears arranged in the tail pass (−) are in mesh.

The transmission gear train 158 includes a first pair of gears 178 arranged on the transmission input shaft 110. The first pair of gears 178 includes a first transmission gear 112 and a second transmission gear 114. In one example, the first clutch 134 may be positioned between the first pair of gears 178. The first clutch 134 may be designed to selectively engage one of the gears 112, 114 while disengaging the other gear. Further, the first clutch 134 may be designed to operate in a neutral configuration where both of the gears 112, 114 are disengaged from the transmission input shaft 110. When the first clutch 134 disengages one of the gears 112, 114, the gear is allowed to independently rotate with regard to the transmission input shaft 110. In one example, to enable the gears 112, 114 to independently rotate with regard to the transmission input shaft 110, bearings (e.g., needle bearings) may be positioned between the gears 112, 114 and the transmission input shaft 110.

Conversely, when the first clutch 134 engages one of the gears 112, 114, the engaged gear and the transmission input shaft 110 rotate in unison while the transmission input shaft 110 independently rotates in relation to the other gear. To accomplish this functionality, the first clutch 134 may be, but is not limited to, a dog clutch. The dog clutch may include a splined sleeve and/or radially aligned plates with teeth that are design to mate with splines and/or teeth, respectively, in the gears 112, 114. Alternatively, the first clutch 134 may be a synchronizer with a ring that allows the speeds of the shaft and the gear to be synchronized during clutch engagement. Still further in other examples, the first clutch 134 may be a wet or dry friction clutch. The friction clutches may include sets of plates that frictionally engage and disengage one another, during clutch engagement and disengagement.

The idler shaft 118 includes a second pair of gears 180 fixedly coupled thereto such that the idler shaft 118 and the gears jointly rotate during transmission operation. The second pair of gears 180 includes the third transmission gear 116 and the fourth transmission gear 120. The third transmission gear 116 is radially aligned with the first transmission gear 112 and meshes therewith. Likewise, the fourth transmission gear 120 is radially aligned with the second transmission gear 114 and meshes therewith. In one example, one of the gears in the second pair of gears 180 may have a larger pitch diameter than the radially aligned meshing gear on the idler shaft 118. For example, first transmission gear 112 may have a larger pitch diameter than the third transmission gear 116. Consequently, a speed-up occurs across said mesh which may result in reduced inertia when shifting, thereby enhancing shifting performance.

The transmission gear train 158 further includes a third pair of gears 182 arranged on the output shaft 126. The third pair of gears 182 includes a fifth transmission gear 122 and a sixth transmission gear 124. The fifth transmission gear 122 is radially aligned with the third transmission gear 116 and meshes therewith, and the sixth transmission gear 124 is radially aligned with the fourth transmission gear 120 and meshes therewith.

The second clutch 136 is positioned between the third pair of gears 182 and is designed to selectively engage one of the gears while disengaging the other gear. Further, the second clutch 136 may be designed to operate in a neutral configuration where both the gears are disengaged from the transmission input shaft 110. When the second clutch 136 disengages one of the fifth transmission gear 122 or the sixth transmission gear 124, the gear is allowed to independently rotate in relation to the output shaft 126. In one example, to permit rotation of the gears 122, 124, bearings (e.g., needle bearings) may be positioned between the gears 122, 124 and the output shaft 126, respectively.

Conversely, when the second clutch 136 engages one of the gears 122, 124, the gear and the output shaft 126 rotate in unison. To accomplish this functionality, the second clutch 136 may be, but is not limited to, a dog clutch, a synchronizer, or a friction clutch. The first clutch 134 and second clutch 136 may have a similar design, in one example, to simplify manufacturing and repair. For instance, the clutches 134, 136 may each be dog clutches or synchronizers. However, in other examples, the clutches 134, 136 may be a combination of different designs. Further, the clutches may be, but are not limited to, hydraulically, pneumatically, and/or electro-mechanically actuated, in one example, or a combination.

In one example, the output shaft 126 may be rotationally coupled to the hypoid gear set 132, comprising a gear 133 (e.g., a ring gear) in a differential, or other suitable downstream component, and gear 131 (e.g., pinion gear). Alternatively, the gear 133 may be coupled to a driveline or may be another suitable type of mechanical interface. The gear 131 may specifically be a bevel gear, in one example. However, a variety of suitable output gears have been contemplated (e.g., helical, spur).

The interaxle output shaft 184 may be coupled to the output shaft 126 via the transmission gear train 158. As one example, a second axle or PTO device may be coupled directly to the electric axle 100 via the interaxle output shaft 184. In some examples, the interaxle output shaft 184 may include a supplemental output (e.g., 228 in FIG. 2) for providing motive power to the auxiliary device. In other examples, the interaxle output shaft 184 may couple to the auxiliary device to the electric axle 100 via an interaxle differential (e.g., 286 in FIG. 2). In yet other examples, the coupling of the interaxle output shaft 184 with an auxiliary device or PTO device may include a clutch (e.g., third clutch 238).

The electric axle 100 may be electronically connected (e.g., wirelessly or wired) to a controller 162. The controller 162 may include a processor 164 operatively connected to a memory 166. The memory 166 may be a non-transitory computer-readable medium and may be configured to store executable instructions (e.g., computer executable code) to be processed by the processor 164 in order to execute one or more control methods, such as method 400 illustrated in FIG. 4. The memory 166 may also be configured to store data received by the processor 164.

The controller 162 receives signals from the various sensors 168 and employs the various actuators 170 to adjust system operation based on the received signals and instructions stored on the memory 166 of the controller. Sensors 168 may include motor speed sensors, shaft/gear speed sensors, current sensors, temperature sensors, humidity sensors, and so on for monitoring the electric axle 100. As another example, an input device 198 (e.g., accelerator pedal, brake pedal, gear selector, combinations thereof, and so on) may further provide input signals indicative of an operator's intent for vehicle control.

Upon receiving the signals from the various sensors 168 of FIG. 1, the controller 162 processes the received signals, and employs various actuators 170 of vehicle components to adjust the components based on the received signals and instructions stored on the memory of controller 162. For example, the controller 162 may receive an input device 198 signal indicative of an operator request for a vehicle acceleration adjustment. In response, the controller 162 may command operation of the electric motor 102 to increase the power delivered from the motor to the transmission gear train 158. The controller 162 may, during certain operating conditions, be designed to send commands to the clutches 134, 136 and in response use clutch actuators to engage or disengage selected gears. For example, the control system may have instructions stored on the memory of the controller 162 that when executed cause the controller to select a mode of operation, such as an operating gear, and based on the mode of operation selected, the controller may adjust one or more of the first clutch 134 and the second clutch 136 of the transmission gear train 156. The clutch actuators may include a first clutch actuator 134a for controlling a position of the first clutch 134 and a second clutch actuator 136a for controlling a position of the second clutch 136. The controller 162 may detect clutch position from signals sent via a first clutch position sensor 134b for detecting a position of the first clutch 134 and a second clutch position sensor 136b for detecting a position of the second clutch 136. The other controllable components in the vehicle may function in a similar manner with regard to sensor signals, control commands, and actuator adjustment, for example. As another example, the controller 162 may automatically adjust one or more clutch actuators based on signals from one or more traction sensors for monitoring wheel traction.

The electric axle 100 may be a self-contained axle assembly. The electric axle 100 may include a housing or enclosure, shown as housing 152 that contains and supports the components of the electric axle 100. As shown, the housing 152 at least partially (e.g., partially, completely) the power path 150 from the electric motor 102 to the first axle 130 including the first shaft 108, the motor input gear pair 156, the transmission input shaft 110, the power transmission gear train 158, the idler shaft 118, the output shaft 126, the hypoid gear set 132, the first clutch 134, and the second clutch 236. The axle half shafts 140, 142 may extend outside of the housing 152 to couple to the wheels 144. The interaxle output shaft 184 may extend outside of the housing 152 to couple to the auxiliary device.

FIG. 2 shows an example configuration for an electric axle 200. The electric axle 200 may be similar to electric axle 100. The electric axle 200 includes an electric motor 202 directly mounted to a first axle 230. The rotational axis 248 of the electric motor 202 is provided. Electric motor 202 may receive electrical power from a battery 260 to provide torque to the first axle 230 and, in some examples, when functioning as a motor-generator, the electric motor 202 may provide electrical power to the battery 260. The dashed outline indicates a power path 250 of the electric axle 200 comprising a plurality of internal gears and shafts for transmitting power from the electric motor 202 to the first axle 230. The electric axle 200 may selectively provide rotational mechanical energy to power an auxiliary axle, e.g., a traditional axle, or auxiliary device e.g., a PTO device.

In the example, the electric axle 200 is shown coupled to an auxiliary axle assembly, shown as the second axle 254 via a supplemental output 228. The first axle 230 may be rotatably coupled with a pair of wheels 244 via axle half shafts 240, 242. The second axle 254 may be rotatably coupled with a pair of wheels 246 via axle half shafts 271, 272. The second axle 254 may not include an integrated electric motor, such that the second axle 254 is not an electric axle. Instead, the second axle 254 may be driven exclusively by the electric axle 200. In some examples, the electric axle 200 and the second axle 254 form a tandem. By way of example, the electric axle 200 may be a first rear axle and the second axle 254 may be a second rear axle of a rear tandem axle. The electric motor 202 generates mechanical energy that may be transferred through the first axle 230 to drive the wheels 244 about an axis 274 and through the second axle 254 to drive the wheels 246 about an axis 276.

In one example, the power path 250 of the electric axle 200 may be arranged similarly to the power path 150 illustrated with respect to FIG. 1. In the example, the power path 250 of electric axle 200 includes a first shaft 208 coupling the electric motor 202 to a motor input gear pair 256. A transmission input shaft 210 couples the motor input gear pair 256 with a power transmission gear train 258. The power transmission gear train 258 may include a plurality of gears and a plurality of clutches for selectively engaging the gears with the transmission input shaft 210 and the output shaft 226. The output shaft 226 may couple the transmission gear train 258 to the first axle 230, in one example, via a hypoid gear set 232. An interaxle output shaft 284 may be coaxial with the output shaft 226 and driven via the power transmission gear train 258 coupled thereto. In the example, the interaxle output shaft 284 is shown coupling the second axle 254 to the electric axle 200. In other examples, the interaxle output shaft 284 may couple a PTO device to the electric axle 200.

In one example, the motor input gear train 256 of electric axle 200 may comprise a first input gear 204 in mesh with a second input gear 206. In one example, the first input gear 204 and second input gear 206 may form an initial gear reduction. The transmission gear train 258 may comprise a first pair of gears 278 arranged on the transmission input shaft 210, a second pair of gears 280 arranged on the idler shaft, and a third pair of gears 282 arranged on the output shaft 226. The first pair of gears 278 may include a first transmission gear 212 and a second transmission gear 214. The second pair of gears 280 includes the third transmission gear 216 and the fourth transmission gear 220. The third pair of gears 282 includes a fifth transmission gear 222 and a sixth transmission gear 224. The fifth transmission gear 222 is radially aligned and in-mesh with the third transmission gear 216 and the third transmission gear 216 aligned likewise with the first transmission gear 212. The sixth transmission gear 224 is radially aligned and in-mesh with the fourth transmission gear 220 and the fourth transmission gear 220 aligned likewise with the second transmission gear 214. In one example, the hypoid gear set 232 includes a gear 233 (e.g., a ring gear) and gear 231 (e.g., pinion gear).

Similar to the transmission gear train 158 described with respect to FIG. 1, the transmission gear train 258 may include a plurality of clutches for selecting driving modes, e.g., different operating gears, of the electric axle 200. In some examples, the clutches of electric axle 200 may be, but are not limited to, dog clutches, synchronizer clutches, wet or dry friction clutches. Electric axle 200 is shown having three clutches. In one example, a first clutch 234 may be positioned between the first pair of gears 278 for selectively engaging one of the gears 212, 214 while disengaging the other gear. The first clutch 234 may be designed to operate in a neutral configuration where both of the gears 212, 214 are disengaged from the transmission input shaft 210. When the first clutch 234 disengages one of the gears 212, 214, the gear is allowed to independently rotate with regard to the transmission input shaft 210. Conversely, when the first clutch 234 engages one of the gears 212, 214, the engaged gear and the transmission input shaft 210 rotate in unison while the transmission input shaft 210 independently rotates in relation to the other gear. The second pair of gears 280 are fixedly coupled to the idler shaft 218 such that the idler shaft 218 and the gears jointly rotate during transmission operation. A second clutch 236 may be positioned between the third pair of gears 282 and operate similarly to the first clutch 234.

The electric axle 200 is shown including a third clutch 238 for selectively coupling the supplemental output 228 to the transmission gear train 258 via the interaxle output shaft 284. As one example, engaging the third clutch 238 may provide power from electric axle 200 to the second axle 254 in any gear other than neutral and the vehicle is moving. In other words, the third clutch 238 rotationally couples the interaxle output shaft 284 and the transmission gear train 256 in any operating gear except neutral. For example, the motor torque delivered to the auxiliary component coupled via supplemental output 228 may be the product of the input gear pair 256 ratio and the selected transmission gear train 258 ratio. In one example, the specific type of clutch used for the third clutch 238 to engage supplemental output will determine feasibility of shift on the fly capability. Example driving modes and clutching configurations are discussed in FIG. 3A and FIG. 3B.

The electric axle 200 is shown including a similar electronic control system as illustrated with respect to electric axle 100 of FIG. 1. For example, electric axle 200 may be electronically connected (e.g., wirelessly or wired) to a controller 262. The controller 262 may include a processor 264 operatively connected to a memory 266. The electronic control system may include various sensors 268 such as motor speed sensors, shaft/gear speed sensors, current sensors, temperature sensors, humidity sensors, and so on for monitoring the electric axle 200. Signals from the various sensors 268 may be received by the controller 262, and in response, the controller 262 may employs various actuators 270 of vehicle components to adjust the components based on the received signals and instructions stored on the memory of controller 262.

As one example, the control system may have instructions stored on the memory of the controller 262 that when executed cause the controller to select a mode of operation, such as an operating gear, and based on the mode of operation selected, the controller may adjust one or more of the first clutch 234 and the second clutch 236 of the transmission gear train. As another example, the controller 262 may have further instructions that when executed cause the controller to adjust the third clutch 238 based on an indication to output power to the second axle 254. The control system may include an input device 298 for providing input signals indicative of an operator's intent for vehicle control. In some examples, actuators may a first clutch actuator 234a for controlling a position of the first clutch 234, a second clutch actuator 236a for controlling a position of the second clutch 236, and a third clutch actuator 238a for controlling a position of the third clutch 238. The controller 262 may detect clutch position from signals sent via a first clutch position sensor 234b for detecting a position of the first clutch 234, a second clutch position sensor 236b for detecting a position of the second clutch 236, and a third clutch position sensor 238b for detecting a position of the third clutch 238.

In some examples, the electric axle 200 may include an interaxle differential 286. In one example, the interaxle differential 286 may be interposed between the output shaft 226 and the supplemental output 228. As one example, including the interaxle differential 286 may increase handling especially on corners and uneven road surfaces by enabling rotational speed variation between wheels 244 of the first axle 230 and wheels 246 of the second axle 254. As another example, the interaxle differential 286 may allow axle speed differences while on hard surfaces. Additionally or alternatively, the interaxle differential 286 may include differential lock capability. For example, the differential lock capability may provide increased traction on soft and loose surfaces. The interaxle differential 286 may be in electronic communication with the controller 262. Activation of disconnect or full locking of the second axle 254 (or other coupled device) may be controlled automatically or through operator activation of pneumatic or electrical switch and clutch mechanisms. In one example, there may be no distinction between operation of the third clutch for PTO or the third clutch for enabling the second axle through the IAD, if included. In another example, the electric axle 200 may include torque biasing differential 288 positioned in at least one of the first axle 230 and the second axle 254 for added tractive effort without software, controls, or operator engagement. For example, including the torque biasing differential 288 may enable wheel speed differences on hard surfaces and torque transfer on soft surfaces without need for controls or driver intervention. In one example, the electric axle may include an interaxle differential with one of an open differential, locking capability, or a torque biasing differential. In one example, the electric axle 200 may drive either the second axle 254 or a supplemental PTO load but not both.

The electric axle 200 may be a self-contained axle assembly, for example, including housing 252 that contains and supports the components of the electric axle 200. As shown, the housing 252 at least partially (e.g., partially, completely) the power path 250 from the electric motor 202 to the first axle 230. In some examples, the interaxle output shaft 284 and supplemental output 228 may extend outside of the housing 252 to couple to the auxiliary component. For example, the interaxle output shaft 284 and supplemental output 228 may extend outside of the housing 252 to couple to the second axle 254.

Utilizing the electric axle 200 to selectively drive, e.g., selective provide rotational mechanical energy, the second axle 254 permits more flexible operation of a commercial vehicle than utilizing two independent electric axles. When the electric axle 200 is disengaged from the second axle 254, all of the power delivered by the electric motor 202 can be directed through the wheels 244 of the electric axle 200. In contrast, a system including two electric axles would require two separate electric motors, each of which independently drives the wheels of the corresponding axle. In such a configuration, it would not be possible to direct all of the power of both motors through the same set of wheels (e.g., the wheels associated with one of the axles). Accordingly, the electric axle 200 permits a greater output power through a set of wheels for a given motor size than an arrangement that includes two independent electric axles. When it is desirable to drive the wheels 244 of the electric axle 200 and the wheels 246 of the second axle 254 simultaneously (e.g., in a low traction environment), the electric axle 200 can be coupled to the second axle 254. Accordingly, the arrangement of FIG. 2 can provide similar or the same all-wheel drive performance to an arrangement that utilizes two independent electric axles.

FIG. 3A and FIG. 3B are a table 300 and a table 350, respectively, illustrating operating modes of the disclosed electric axles. As one example, FIG. 3A may describe driving modes for an example electric axle having a first clutch and a second clutch, such as described with respect to electric axle 100 illustrated in FIG. 1. In one example, the clutches may be the same or similar to first clutch 134 and second clutch 136. FIG. 3B may describe driving modes for an example electric axle having a first clutch, a second clutch, and a third clutch, such as electric axle 200 illustrated in FIG. 2. For example, the clutches may be the same or similar to first clutch 234, second clutch 236, and third clutch 238. As one example, by swapping clutches on the input shaft and the output shaft, e.g., transmission input shafts 110, 210 and output shafts 126, 226, four gear ratios may be realized. The third clutch or PTO clutch may be disengaged to decouple the auxiliary component from the transmission gear train such that the interaxle output shaft rotates freely. The third clutch may be engaged to drive the supplemental output at the selected gear ratio.

Table 300 and Table 350 depict exemplary modes that may be realized using various clutch combinations. In one example, the modes include gear 1, gear 2, gear 2a, gear 3, and neutral. In one example, the gear ratios associated with the different modes may sequentially decrease. For instance, in one use-case example, the gear 1 gear ratio may be 26.00:1, the gear 2 gear ratio may be 14.43:1, the gear 2a gear ratio may be 12.13:1, and the gear 3 gear ratio may be 6.73:1. However, numerous ratios for each mode have been contemplated. The range of ratios as well as the step between the ratios in the different operating modes may be selected based on a variety of factors such as the expected operating speed range of the motor, the expected range of transmission loads, desired vehicle speed ranges, and the like.

Table 300 and Table 350 illustrate a position of the first clutch and the second clutch. In one example, the position of the clutch (e.g., first or second clutch) may be actuated to engage the gear of head pass (e.g., first gear) or the gear of the tail pass (e.g., second gear). Clutch engagement with a gear of the head pass is shown as a plus sign (+) in the table and clutch engagement with a gear of tail pass is shown as a (−) sign in the table. In further example, the position of the clutch (e.g., first or second) may be neutral such that the gears are disengaged from the shaft (e.g., input or output), which is shown as a (0) in the table. Table 350 further illustrates a position of the third clutch, which may be open or closed.

Turning now to FIG. 3A, the modes of operation will be discussed herein with reference to electric axle 100. However, it may be understood that the modes of operation may be similarly selected with reference to electric axle 200.

In one example, the gear 1 mode of operation includes actuating the first clutch 134 to engage the first pair of gears 178 along the tail pass (−) and actuating the second clutch 136 to engage the third pair of gears 182 along the head pass (+). In gear 1, the power path travels from the input shaft 110 to the second transmission gear 114, from the second transmission gear 114 to the fourth transmission gear 120, from the fourth transmission gear 120 to the idler shaft 118, across the idler shaft 118 to the fifth transmission gear 122 via the third transmission gear 116, from the fifth transmission gear 122 to the output shaft 126, and from output shaft 126 to the interaxle output shaft 184. Subsequently, the power paths may travel through a differential, axle shafts, and to the drive wheels.

In one example, the gear 2 mode of operation includes actuating the first clutch 134 to engage the first pair of gears 178 along the tail pass (−) and actuating the second clutch 136 to engage the third pair of gears 182 along the tail pass (−). In gear 2, the power path travels from the input shaft 110 to the second transmission gear 114, from the second transmission gear 114 to the fourth transmission gear 120, from the fourth transmission gear 120 to the sixth transmission gear 124, from the sixth transmission gear 124 to the output shaft 126, and from output shaft 126 to the interaxle output shaft 184. Subsequently, the power paths may travel through a differential, axle shafts, and to the drive wheels.

In one example, the gear 2a mode of operation includes actuating the first clutch 134 to engage the first pair of gears 178 along the head pass (+) and actuating the second clutch 136 to engage the third pair of gears 182 along the head pass (+). In gear 2a, the power path travels from the input shaft 110 to the first transmission gear 112, from the first transmission gear 112 to the third transmission gear 116, from the third transmission gear 116 to the fifth transmission gear 122, from the fifth transmission gear 122 to the output shaft 126, and from output shaft 126 to the interaxle output shaft 184. Subsequently, the power paths may travel through a differential, axle shafts, and to the drive wheels.

In one example, the gear 3 mode of operation includes actuating the first clutch 134 to engage the first pair of gears 178 along the head pass (+) and actuating the second clutch 136 to engage the third pair of gears 182 along the tail pass (−). In gear 3, the power path travels from the input shaft 110 to the first transmission gear 112, from the first transmission gear 112 to the third transmission gear 116, from the third transmission gear 116 to the idler shaft 118, across the idler shaft 118 to the sixth transmission gear 124 via the fourth transmission gear 120, from the sixth transmission gear 124 to the output shaft 126, and from output shaft 126 to the interaxle output shaft 184. Subsequently, the power paths may travel through a differential, axle shafts, and to the drive wheels.

Turning now to FIG. 3B, the modes of operation will be discussed herein with reference to electric axle 200. For the selection of a mode of operation, the corresponding clutch configuration for the first clutch 234 and the second clutch 236, and the power path through the transmission gear train 258 may be the same or similar for electric axle 200 and electric axle 100. In addition, electric axle 200 may include the third clutch 238. In one example, by actuating the third clutch open, the interaxle output shaft 284 and auxiliary device coupled thereto, e.g., second axle 254, may rotate independently from the selected gear ratio of the transmission gear train 258. By actuating the third clutch 238 closed, the interaxle output shaft 284 may rotate at the selected gear ratio of the transmission.

As one example, by actuating the first clutch 234 to engage the first pair of gears 278 along the tail pass (−), the second clutch 236 to engage the third pair of gears 282 along the head pass (+), and closing the third clutch 238, the first axle 230 and the second axle 254 may be controlled in the gear 1 mode of operation. As another example, by actuating the first clutch 234 to engage the first pair of gears 278 along the tail pass (−), actuating the second clutch 236 to engage the third pair of gears 282 along the tail pass (−), and closing the third clutch 238, the first axle 230 and the second axle 254 may be controlled in the gear 2 mode of operation. As another example, by actuating the first clutch 234 to engage the first pair of gears 278 along the head pass (+) and actuating the second clutch 236 to engage the third pair of gears 282 along the head pass (+), and closing the third clutch 238, the first axle 230 and the second axle 254 may be controlled in the gear 2a mode of operation. As a further example, by actuating the first clutch 234 to engage the first pair of gears 278 along the head pass (+), actuating the second clutch 236 to engage the third pair of gears 282 along the tail pass (−), and closing the third clutch 238, the first axle 230 and the second axle 254 may be controlled in the gear 3 mode of operation. In one example, the motor torque to the first axle 230 may be the product of the transmission gear train 258 ratio, the motor input gear train 256 ratio, and, if included, the hypoid gear set 232 ratio. The motor torque to the second axle 254 (or other auxiliary device) may be the product of the transmission gear train 258 ratio, the motor input gear train 256 ratio, and, if included, a second hypoid gear set ratio. If included, the hypoid gear set 232 ratio may be the same as a second hypoid gear set ratio or they may be different.

FIG. 4 shows a method 400 of operation for an electric axle having a supplemental output to an auxiliary component. As one example, the method 400 corresponds to a method of operation of the electric axle 200, shown in FIG. 2, FIG. 3A, and FIG. 3B. Instructions for carrying out method 400 may be executed by a controller based on instructions stored on a memory of the controller and in conjunction with signals received from sensors of the electric axle system, such as the sensors 268 described above with reference to FIG. 2. The controller may employ actuators of the electric axle assembly to adjust electric axle operation, according to the method described below. Example actuators may include actuators 270, first clutch actuator 234a, second clutch actuator 236a, and third clutch actuator 238a described above with respect to FIG. 2.

At 402, the method determines operating conditions. The operating conditions may include input device position (e.g., gearshift lever position, accelerator pedal position, and the like), clutch configuration, vehicle speed, vehicle load, transmission load, motor speed, ambient temperature, and the like. The operating conditions may be ascertained via sensor inputs, modeling, look-up tables, and/or other suitable techniques.

At 404, the method determines if a gear shift is desired. This determination may be automatically implemented based on motor speed, accelerator pedal position, brake pedal position, vehicle speed, vehicle load, and the like. Alternatively, this determination may be implemented responsive to operator interaction with a gear selector.

If a gear shift is not desired, the method moves to 418. If a gear shift is desired, the method moves to 406. At 406, the method selects a mode of operation based on vehicle operating conditions. For example, one mode of the four modes described with respect to FIG. 3A and FIG. 3B may be selected. For instance, during conditions where a lower ratio is desired, the electric axle may shift from Gear 1 to Gear 2, and vice versa, where a higher ratio is desired. At 408, the method refers to the clutch configuration for Gear 1: actuating the first clutch to engage the first pair of gears along the tail pass (−) and the second clutch to engage the third pair of gears along the head pass (+). At 410, the method refers to the clutch configuration for Gear 2: actuating the first clutch to engage the first pair of gears along the tail pass (−) and the second clutch to engage the third pair of gears along the tail pass (−). At 412, the method refers to the clutch configuration for Gear 2a: actuating the first clutch to engage the first pair of gears along the head pass (+) and the second clutch actuated to engage the third pair of gears along the head pass (+). At 414, the method refers to the clutch configuration for Gear 3: actuating the first clutch to engage the first pair of gears along the head pass (+) and the second clutch to engage the third pair of gears along the tail pass (−). At 415, the method refers to the clutch configuration for neutral: opening the first clutch to disengage the first pair of gears from the input shaft and opening the second clutch to disengage the third pair of gears from the output shaft.

At 416, the method adjusts the first clutch and the second clutch based on the selected mode. As an example, the method may include transitioning between two of the operating gears. For example, the adjusting may include shifting from the Gear 1 to Gear 2. In one example, adjusting from Gear 1 to Gear 2 may include adjusting the second clutch 236 to engage the fifth transmission gear 222 and disengage the sixth transmission gear 224. For example, upon mode selection (e.g., automatic or operator-selected) an electronic signal may be sent to the first clutch actuator 234a to engage the fifth transmission gear 222 and disengage the sixth transmission gear 224. While shifting from the Gear 1 to the Gear 2, the first clutch 234 sustains engagement of the second transmission gear 214 and disengagement of the first transmission gear 212.

At 418, the method determines if output power to an auxiliary component is desired. This determination may be automatically implemented based on based on signals from one or more sensors such as for monitoring wheel traction, vehicle load, and the like. Alternatively, this determination may be implemented responsive to operator interaction with a control system interface. If output to an auxiliary component is not desired the method moves to 428.

At 428, the method includes sustaining the current transmission operating strategy. For instance, the transmission may remain in its current operating gear and the clutches therefore remain in their current position. If output to an auxiliary component is desired the method moves to 420.

At 420, the method determines whether the selected mode of the electric axle is neutral. If the selected mode is neutral, the method moves to 422. At 422 the method transitions out of neutral and returns to 416 to select a gear. As described above, power may be provided to the output device when the transmission gear train is in any mode of operation except neutral. If the selected mode is not neutral, the method moves to 424.

At 424, the method closes the third clutch. As one example, activation of the auxiliary component may be controlled automatically or through operator activation of air or electrical switch mechanisms in electronic communication with the clutches of the system. For example, upon auxiliary component selection (e.g., automatic or operator-selected) an electronic signal may be sent to the third clutch actuator 238a to close the third clutch 238.

At 426, the method ramps motor speed to drive the auxiliary component. As described above, power may be provided to the auxiliary device when the vehicle is moving due to third clutch being positioned on the output shaft.

In this way, an electric axle may enable an output capability to drive an additional axle or other auxiliary device. By directly mounting the electric motor to the e-axle, the connection between the e-axle and the auxiliary component is by way of an interaxle shaft that may allow for axle articulation and slip features. The disclosure offers flexibility by providing an e-axle capable of forming a tandem for load carrying and traction purposes when desired while enabling a mechanical output drive capability otherwise. Additional flexibility may be achieved by attaching the auxiliary component to various geared features to allow for alternative speed of operation. Further, the auxiliary component may be combined with an interaxle differential to allow for tire speed variation during operation. Alternatively, a gear or shaft disconnect in the auxiliary axle or auxiliary device may be used instead of an interaxle differential. Even more flexibility may be achieved by including a torque biasing wheel differential to allow for added tractive effort without software, controls, or operator engagement. The electric axle has a further advantage of facilitating brake regeneration to the electronic motor from a variety of wheel ends connected to the system. The technical effect of the systems and methods disclosed herein include enabling electric direct drive of auxiliary equipment or an additional axle without adding additional motors or inverters.

The disclosure also provides support for an assembly comprising: a first axle, an electric motor directly mounted to the first axle, a transmission gear train coupling the electric motor to an interaxle output shaft, and a plurality of clutches for selectively coupling the electric motor and the interaxle output shaft, the interaxle output shaft selectively driving one of a second axle and an auxiliary device. In a first example of the system, the system further comprises: an interaxle differential and a supplemental output, wherein the interaxle differential is interposed between the interaxle output shaft and supplemental output. In a second example of the system, optionally including the first example, the transmission gear train comprises an input shaft with a first pair of gears that reside thereon, a first clutch positioned between the first pair of gears and designed to selectively rotationally couple a selected gear in the first pair of gears to the input shaft, an idler shaft with a second pair of gears fixedly coupled thereto, an output shaft with a third pair of gears that reside thereon, and a second clutch positioned between the third pair of gears and designed to selectively rotationally couple the selected gear in the third pair of gears to the output shaft. In a third example of the system, optionally including one or both of the first and second examples, the system further comprises: a third clutch positioned between the supplemental output and the transmission gear train and designed to selectively rotationally couple the interaxle output shaft and the transmission gear train. In a fourth example of the system, optionally including one or more or each of the first through third examples, the system further comprises: a controller having instructions that when executed cause the controller to select a mode of operation and based on the mode of operation selected, adjust one or more of a first clutch and a second clutch of the transmission gear train. In a fifth example of the system, optionally including one or more or each of the first through fourth examples the controller further having instructions that when executed cause the controller to adjust a third clutch based on an indication to output power to an auxiliary component. In a sixth example of the system, optionally including one or more or each of the first through fifth examples, the transmission gear train comprises a plurality of helical gears in constant mesh, at least some of the plurality of helical gears being selectively couplable with a plurality of parallel shafts via the plurality of clutches. In a seventh example of the system, optionally including one or more or each of the first through sixth examples, the plurality of clutches are dog clutches or synchronizers. In an eighth example of the system, optionally including one or more or each of the first through seventh examples, the system further comprises: a housing containing the first axle, the electric motor, and the transmission gear train. In a ninth example of the system, optionally including one or more or each of the first through eighth examples, the system further comprises: a torque biasing differential positioned in one or both of the first axle and the second axle.

The disclosure also provides support for a method for an electric axle having an electric motor directly mounted to a first axle and transmission gear train selectively coupling the electric motor to an interaxle output shaft, the interaxle output shaft selectively driving an auxiliary component, comprising: selecting a mode of operation, and adjusting one or more of a plurality of clutches of the transmission gear train based on the mode of operation. In a first example of the method, the plurality of clutches include a first clutch for selectively coupling one of a first pair of gears with an input shaft and a second clutch for selectively coupling one of a third pair of gears with an output shaft. In a second example of the method, optionally including the first example, the plurality of clutches include a third clutch for selectively coupling the auxiliary component with the interaxle output shaft. In a third example of the method, optionally including one or both of the first and second examples, engaging the third clutch rotationally couples the interaxle output shaft and the transmission gear train in any mode of operation except neutral. In a fourth example of the method, optionally including one or more or each of the first through third examples, the mode of operation includes one or more of selecting an operating gear of the transmission gear train and driving the auxiliary component.

The disclosure also provides support for an assembly comprising: a first axle, an electric motor directly mounted to the first axle, an input gear train coupled to the electric motor, an input shaft coupled to the input gear train, a transmission gear train coupled to the input shaft, an output shaft coupled to the transmission gear train, an interaxle output shaft coupled to the output shaft, and a plurality of clutches for selectively coupling the electric motor to the output shaft and the interaxle output shaft. In a first example of the system, the interaxle output shaft selectively drives one of an additional axle and an auxiliary device. In a second example of the system, optionally including the first example, the interaxle output shaft selectively drives one of an additional axle and an auxiliary device via a clutch. In a third example of the system, optionally including one or both of the first and second examples, the transmission gear train includes a first pair of gears selectively coupled to the input shaft, a second pair of gears fixedly coupled to an idler shaft, and a third pair of gears selectively coupled to the output shaft. In a fourth example of the system, optionally including one or more or each of the first through third examples, the plurality of clutches comprise a first clutch positioned between the first pair of gears and designed to selectively rotationally couple a selected gear in the first pair of gears to the input shaft and a second clutch positioned between the third pair of gears and designed to selectively rotationally couple the selected gear in the third pair of gears to the output shaft and the interaxle output shaft.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or drivetrain control system. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations, and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric motors, internal combustion engines, and/or transmissions. The technology can be used as a stand-alone, or used in combination with other power transmission systems not limited to machinery and propulsion systems for tandem axles, electric tag axles, P4 axles, hybrid electric vehicles (HEVs), BEVs, agriculture, marine, motorcycle, recreational vehicles and on and off highway vehicles, as an example. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An assembly comprising:
 a first axle;
 an electric motor directly mounted to the first axle;
 a transmission gear train coupling the electric motor to an interaxle output shaft; and
 a plurality of clutches for selectively coupling the electric motor and the interaxle output shaft,
 the interaxle output shaft selectively driving one of a second axle and an auxiliary device.

2. The assembly of claim 1, further comprising an interaxle differential and a supplemental output, wherein the interaxle differential is interposed between the interaxle output shaft and supplemental output.

3. The assembly of claim 2, further comprising a third clutch positioned between the supplemental output and the transmission gear train and designed to selectively rotationally couple the transmission gear train to the supplemental output and the auxiliary device via the interaxle output shaft.

4. The assembly of claim 1, wherein the transmission gear train comprises an input shaft with a first pair of gears that reside thereon;
 a first clutch positioned between the first pair of gears and designed to selectively rotationally couple a selected gear in the first pair of gears to the input shaft;
 an idler shaft with a second pair of gears fixedly coupled thereto;
 an output shaft with a third pair of gears that reside thereon; and
 a second clutch positioned between the third pair of gears and designed to selectively rotationally couple a selected gear in the third pair of gears to the output shaft.

5. The assembly of claim 1, further comprising a controller having instructions that when executed cause the controller to select a mode of operation and based on the mode of operation selected, adjust one or more of a first clutch and a second clutch of the transmission gear train.

6. The assembly of claim 5, the controller further having instructions that when executed cause the controller to adjust a third clutch based on an indication to output power to an auxiliary component.

7. The assembly of claim 1, wherein the transmission gear train comprises a plurality of helical gears in constant mesh, at least some of the plurality of helical gears being selectively couplable with a plurality of parallel shafts via the plurality of clutches.

8. The assembly of claim 1, wherein the plurality of clutches are dog clutches or synchronizers.

9. The assembly of claim 1, further comprising a housing containing the first axle, the electric motor, and the transmission gear train.

10. The assembly of claim 1, further comprising a torque biasing differential positioned in one or both of the first axle and the second axle.

11. A method for an electric axle having an electric motor directly mounted to a first axle and a transmission gear train selectively coupling the electric motor to an interaxle output shaft, the interaxle output shaft selectively driving an auxiliary component, comprising:
 selecting a mode of operation; and
 adjusting one or more of a plurality of clutches of the transmission gear train based on the mode of operation.

12. The method of claim 11, wherein the plurality of clutches include a first clutch for selectively coupling one of a first pair of gears with an input shaft and a second clutch for selectively coupling one of a third pair of gears with an output shaft.

13. The method of claim 11, wherein the plurality of clutches include a third clutch for selectively coupling the auxiliary component with the interaxle output shaft.

14. The method of claim 13, wherein engaging the third clutch rotationally couples the interaxle output shaft and the transmission gear train in any mode of operation except neutral.

15. The method of claim 11, wherein the mode of operation includes one or more of selecting an operating gear of the transmission gear train and driving the auxiliary component.

16. An assembly comprising:
 a first axle;
 an electric motor directly mounted to the first axle;
 an input gear train coupled to the electric motor;
 an input shaft coupled to the input gear train;
 a transmission gear train coupled to the input shaft;
 an output shaft coupled to the transmission gear train;
 an interaxle output shaft coupled to the output shaft; and
 a plurality of clutches for selectively coupling the electric motor to the output shaft and the interaxle output shaft.

17. The assembly of claim 16, wherein the interaxle output shaft selectively drives one of an additional axle and an auxiliary device.

18. The assembly of claim 16, wherein the interaxle output shaft selectively drives one of an additional axle and an auxiliary device via a clutch.

19. The assembly of claim 16, wherein the transmission gear train includes a first pair of gears selectively coupled to the input shaft, a second pair of gears fixedly coupled to an idler shaft, and a third pair of gears selectively coupled to the output shaft.

20. The assembly of claim 19, wherein the plurality of clutches comprise a first clutch positioned between the first pair of gears and designed to selectively rotationally couple a selected gear in the first pair of gears to the input shaft and a second clutch positioned between the third pair of gears and designed to selectively rotationally couple a selected gear in the third pair of gears to the output shaft and the interaxle output shaft.

* * * * *